US011336530B2

(12) United States Patent
Goloubev et al.

(10) Patent No.: US 11,336,530 B2
(45) Date of Patent: May 17, 2022

(54) SPATIO-TEMPORAL EVENT WEIGHT ESTIMATION FOR NETWORK-LEVEL AND TOPOLOGY-LEVEL REPRESENTATIONS

(71) Applicant: Cisco Technology, Inc., San Jose, CA (US)

(72) Inventors: Dmitri Goloubev, Waterloo (BE); Nassim Benoussaid, Louvain-la-Neuve (BE); Luc De Ghein, Deinze (BE); Carlos M. Pignataro, Cary, NC (US); Hugo M. Latapie, Long Beach, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/079,728

(22) Filed: Oct. 26, 2020

(65) Prior Publication Data

US 2022/0086050 A1 Mar. 17, 2022

Related U.S. Application Data

(60) Provisional application No. 63/078,028, filed on Sep. 14, 2020.

(51) Int. Cl.
*H04L 29/08* (2006.01)
*H04L 41/12* (2022.01)
(Continued)

(52) U.S. Cl.
CPC .............. *H04L 41/12* (2013.01); *H04L 41/16* (2013.01); *H04L 45/04* (2013.01); *H04L 63/1425* (2013.01); *H04L 63/1433* (2013.01)

(58) Field of Classification Search
CPC ............................... H04L 41/12; H04L 41/16
See application file for complete search history.

(56) References Cited

U.S. PATENT DOCUMENTS 9,811,795 B1 11/2017 Kearns et al.
2018/0048530 A1 2/2018 Nikitaki et al.
(Continued)

OTHER PUBLICATIONS

Calyam, Prasad et al., "Topology-Aware Correlated Network Anomaly Event Detection and Diagnosis", Article in Journal of Network and Systems Management, DOI: 10.1007/s10922-013-9286-0, Apr. 2014, 18 pages.

*Primary Examiner* — Adnan M Mirza
(74) *Attorney, Agent, or Firm* — Edell, Shapiro & Finnan, LLC (57) ABSTRACT

Presented herein are techniques to analyze network anomaly signals based on both a spatial component and a temporal component. A method includes identifying a plurality of factors that trigger a first anomaly signal by a first network node and a second anomaly signal by a second network node in a network comprising a plurality of network nodes, determining that the first network node is adjacent to the second network node in the plurality of network nodes, calculating an anomaly severity score for the first network node based on a number of co-occurring factors from among the plurality of factors that trigger both the first anomaly signal and the second anomaly signal, and adjusting the anomaly severity score for the first network node based on a value of a prior anomaly severity score for the first network node.

20 Claims, 7 Drawing Sheets

(51) Int. Cl.
*H04L 41/16* (2022.01)
*H04L 45/00* (2022.01)
*H04L 29/06* (2006.01)

(56) References Cited

U.S. PATENT DOCUMENTS

| | | |
|---|---|---|
| 2019/0306011 A1 | 10/2019 | Fenoglio et al. |
| 2019/0312898 A1 | 10/2019 | Verma et al. |
| 2020/0186559 A1 | 6/2020 | Hagi et al. |
| 2020/0371857 A1* | 11/2020 | Guha .................... G06F 9/5072 |
| 2021/0089835 A1* | 3/2021 | Ma ..................... G06Q 20/4016 |

* cited by examiner

SPATIO-TEMPORAL EVENT WEIGHT ESTIMATION FOR NETWORK-LEVEL AND TOPOLOGY-LEVEL REPRESENTATIONS

CROSS REFERENCE TO RELATED APPLICATION

This application claims priority to U.S. Provisional Patent Application No. 63/078,028, filed Sep. 14, 2020, the subject matter of which is incorporated herein by reference in its entirety.

TECHNICAL FIELD

The present disclosure relates to network anomaly analysis and more particularly to ranking and/or filtering alerts generated by network nodes.

BACKGROUND

Automated Intellectual Capital (IC) systems (such as issue matching, anomaly detection, health monitoring systems) applied to human-centric workflows tend to produce an amount of alerts far in excess of what human operators can be expected to effectively digest. For example, in a data network comprising many hundreds or even thousands of network nodes (e.g., routers, switches, etc.), each node may, over time, generate one or more error or anomaly signals or alerts. Of course, the larger the network, the larger the overall number of potential alerts that might be generated and presented to a network administrator or engineer. A continued mismatch between the number of alerts produced by the multiple network nodes can lead to cognitive overload of the network administrator or engineer, may lead to a bad reputation for automated IC-based solutions, and may dampen their potential positive impact on network administration and management.

DESCRIPTION OF EXAMPLE EMBODIMENTS

Overview

Presented herein are techniques to analyze network anomaly signals based on both a spatial component and a temporal component. In one embodiment, a method includes identifying a plurality of factors that trigger a first anomaly signal by a first network node and a second anomaly signal by a second network node in a network comprising a plurality of network nodes, determining that the first network node is adjacent to the second network node in the plurality of network nodes, calculating an anomaly severity score for the first network node based on a number of co-occurring factors from among the plurality of factors that trigger both the first anomaly signal and the second anomaly signal; and adjusting the anomaly severity score for the first network node based on a value of a prior anomaly severity score for the first network node.

In another embodiment, an apparatus is provided. The apparatus may include a network interface unit configured to enable network communications, a memory configured to store logic instructions, and a processor, when executing the logic instructions, configured to: identify a plurality of factors that trigger a first anomaly signal by a first network node and a second anomaly signal by a second network node in a network comprising a plurality of network nodes, determine that the first network node is adjacent to the second network node in the plurality of network nodes, calculate an anomaly severity score for the first network node based on a number of co-occurring factors from among the plurality of factors that trigger both the first anomaly signal and the second anomaly signal, and adjust the anomaly severity score for the first network node based on a value of a prior anomaly severity score for the first network node.

EXAMPLE EMBODIMENTS

Network anomaly analysis approaches create a need for ranking and filtering alerts to match with the cognitive bandwidth of a network administrator or engineer. Issues may be filtered and ranked based on a variety of approaches, including:

Information-theoretic (based on frequency, entropy),

Expert based (based on tagging of examples of relevant/irrelevant alerts by experts or system users followed by use of machine learning and/or rule-based approaches to evaluate and filter alerts), and/or Reasoning-based approaches (e.g., Deep Fusion Reasoning Engine (DFRE)).

The embodiments described herein focus on a novel spatio (or spatial)-temporal analysis technique as well as a mechanism for the extraction of symbolic information from machine learning/deep learning (ML/DL) models which can be utilized for explanation as well as incorporated into a DFRE metamodel. It is noted that the described embodiments are synergistic with, but not overlapping with, DFRE.

Increasingly, automated IC engines consume a lot of information to make inferences. More specifically, the advent of ML permits processing large amounts of, e.g., network anomaly data, which means that a large amount of anomaly data provided at an input of a given system may be reduced at an output to a binary output (e.g., problem/no problem, low risk/high risk, not affected/affected) or some other low-dimensional inference.

However, this may pose a problem for an operator who is expected to follow up on the inferences, as the operator needs to understand the cause of an anomaly before an appropriate follow-up strategy can be selected. Machine Learning, in many cases, appears as a black box that reduces input data to an inference on the output. Such input can easily include thousands of factors, readings, counter values, etc.

The described embodiments use Machine Learning explainability methods (such as Partial Dependency Plots (PDP), Local Interpretable Model-agnostic Explanations (LIME), Shapley Additive exPlanations (SHAP) and others) to 'disassemble' the decision of the model and use the obtained underlying explanation to rank, filter or determine a root cause for a given alert. This builds on an important observation that the space of explanations of issues that really occur is much smaller than the space of the input.

Figure 1:
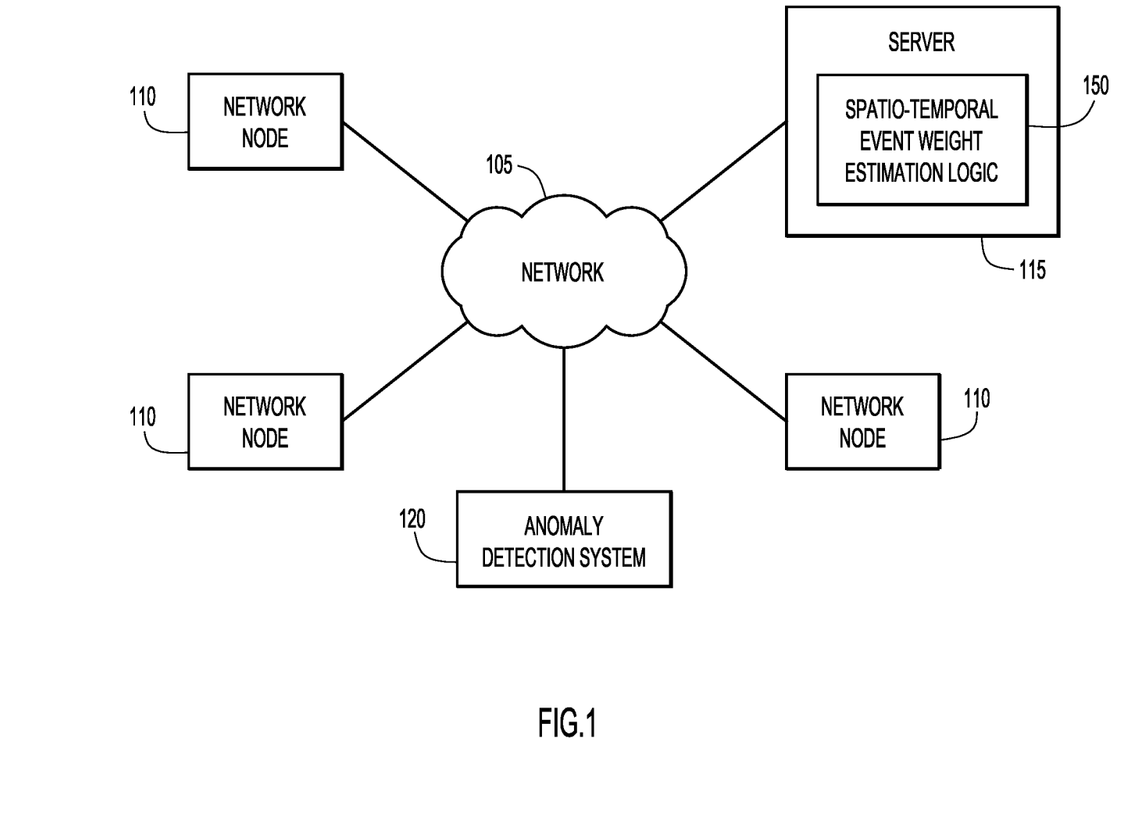
FIG. 1 shows a network topology in which spatio-temporal event weight estimation logic may be employed in accordance with an example embodiment.

FIG. 1 shows a network topology in which spatio-temporal event weight estimation logic 150 may be employed in accordance with an example embodiment. As shown, a plurality of network nodes 110 may be interconnected via a network 105. Network 105, or portions thereof, may be a public network such as the Internet, a private network, local area network (LAN), wide area network (WAN), and may be wired or wireless. Each network node 110 may represent, for example, a router, a switch, or other network device that enables network communication between and/or among host devices (not shown), end users (not shown), or still other network nodes 110. Also in communication with network 105 is server 115 that hosts spatio-temporal event weight estimation logic 150, the function of which will be explained in detail below. Those skilled in the art will appreciate that FIG. 1, showing only a limited number of elements, is merely an example, and a typical network topology might include hundreds, if not thousands of individual network nodes.

Anomalies Signal

The described embodiments may operate in conjunction with an event generator process on top of a network. As such, input to spatio-temporal event weight estimation logic 150 could be an anomaly detection system 120 that generates alerts over time out of thousands of selected counters for each network node 110 associated with network 105. Such anomaly detection systems widely use machine learning and IC engines, and they can be considered as a black box with N factors (inputs) entering over time for each network node 110, and an alert signal coming out for each network node 110.

In this regard, consider the following example. With an input of 4,000 counters, an anomaly is produced/generated, along with an explanation that may be based on only one or two counters. Subsequently a full complement of methods, including information theoretic (most frequent explanation are most often least interesting, etc.), or expert-assisted (where expert can help annotate a subset of explanations) optionally in combination with a set of heuristic rules can be applied.

Figure 2:
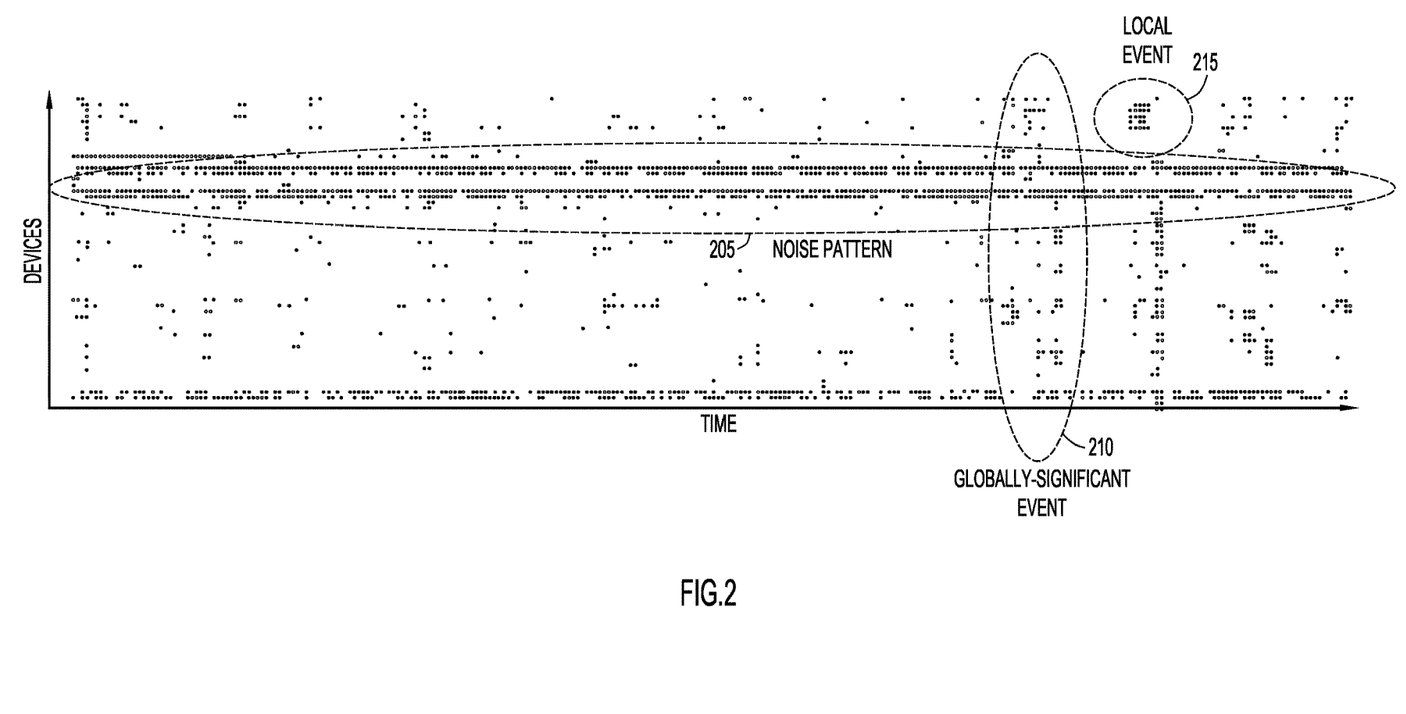
FIG. 2 shows a graph of anomalies over time from a plurality of network nodes in accordance with an example embodiment.

While the alerts contain some signal on their own, there can be issues with them. For example, they can be noisy, there can be too many of them at the whole network level, and they may not be correlated with adjacent network nodes, as if a given network node 110 were a completely independent system. This is well-represented in the graph of FIG. 2, which shows data plane telemetry anomalies for a plurality of network nodes 110 over time. Each dot on the graph of FIG. 2 represents events on a specific network node 110 at a specific time. In some systems, a color may also indicate how many times a given event has occurred.

This visualization is limited by the "spatial dimension." That is, while one can attempt to position two connected network nodes 110 close to each other on the graph of FIG. 2, this quickly becomes unwieldly. The graph of FIG. 2 nevertheless suggests certain patterns:

1. It would be cumbersome, if not impossible, for a human operator to look at each alert individually and draw analytic conclusions; a real network is too large and events are happening too frequently.

2. Some network nodes 110 will always trigger alerts, indicated by the horizontal patterns 205.

3. Some events are globally significant events 210, impacting the whole network in a certain time window.

4. Local events 215 are occurring, triggering alerts on interconnected devices.

Network Representation

Figure 3:
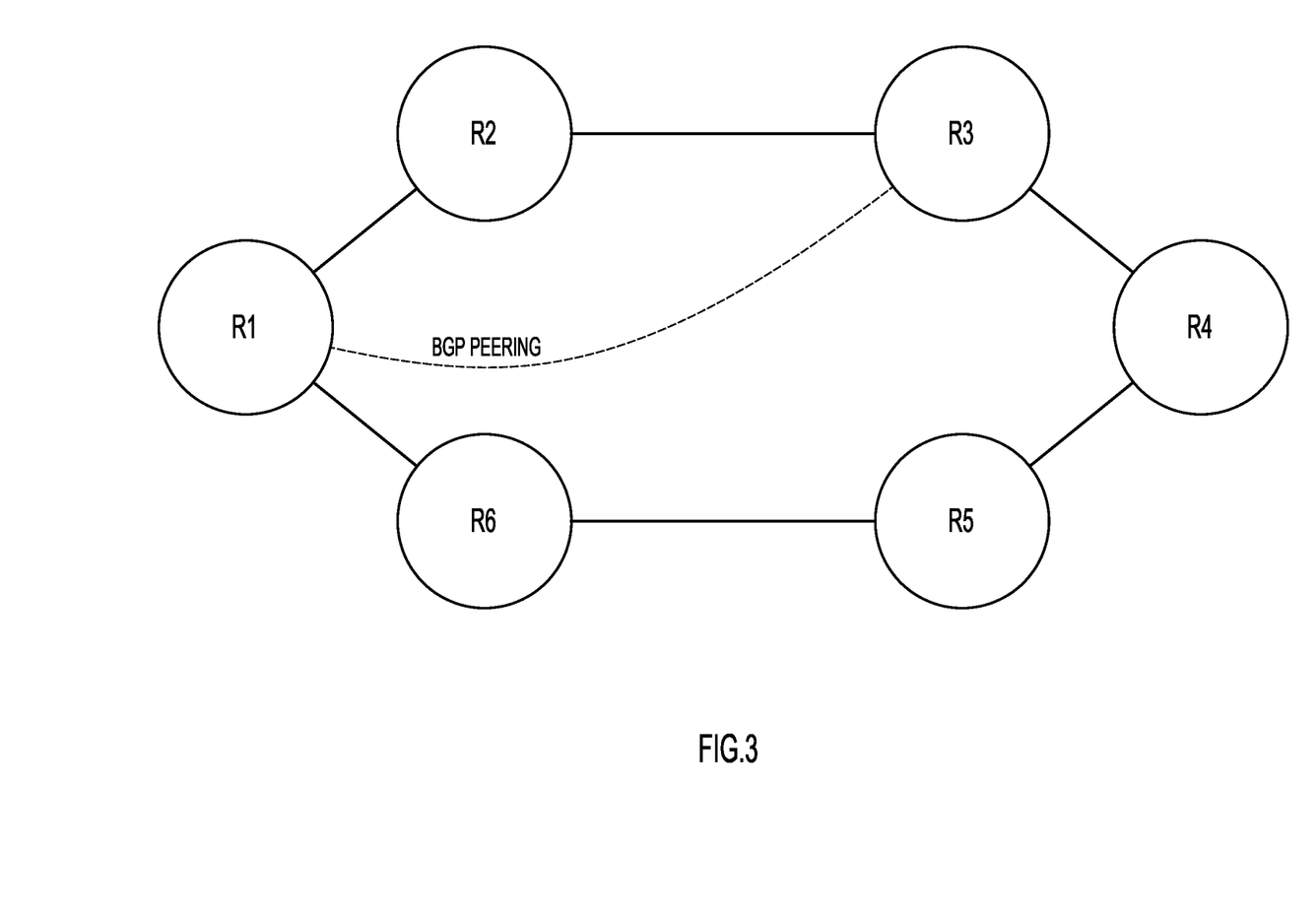
FIG. 3 shows a network topology that may be mapped using spatio-temporal event weight estimation logic to establish adjacency in accordance with an example embodiment.

The described approach, executed by spatio-temporal event weight estimation logic 150, represents a given network as a graph overtime, taking into account a distance metric between each network node 110. FIG. 3 shows a network topology that may be mapped using spatio-temporal event weight estimation logic 150 to establish adjacency in accordance with an example embodiment. The simplest implementation of such distance could be the physical hop count, or the distance between two adjacent routers (R1, R2, R3, R4, R5, R6), where, e.g., router i and router j, would be noted d_ij=1.

This distance can be adapted to represent the type of process being monitored. For example, as also shown in FIG. 3, border gateway protocol (BGP) peering between two physically non-adjacent routers (e.g., R1, R3) could provide a distance of one, even though R1 and R3 are not physically adjacent to one another.

Figure 4:
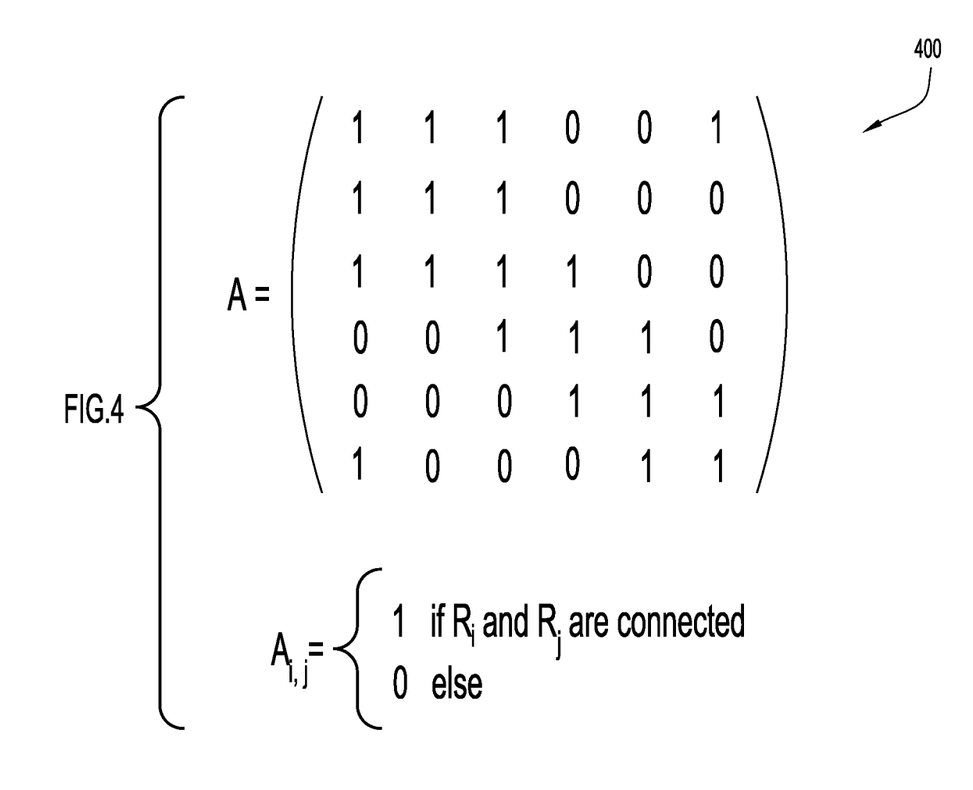
FIG. 4 shows an adjacency matrix generated from the network topology by spatio-temporal event weight estimation logic in accordance with an example embodiment.

FIG. 4 shows an adjacency matrix generated from the network topology by spatio-temporal event weight estimation logic 150 in accordance with an example embodiment. That is, in the above example routers of FIG. 3, spatio-temporal event weight estimation logic 150 generates an adjacency matrix 400, taking BGP peering into account and using a simple distance metric.

Signal Disambiguation at Device Level

Even though the signal, i.e., triggering event(s), comes from a potentially very large number of factors, the signal can be disambiguated using tools such as LIME, PDP, Shapley, among others. These ML explainability methods allow spatio-temporal event weight estimation logic 150 to 'disassemble' the decision of the model and use an underlying explanation to rank, filter or determine a root cause for an alert. This builds on the observation that the space of explanations of issues that really occur is much smaller than the space of the input.

Thus, in accordance with an embodiment, for each event, spatio-temporal event weight estimation logic 150 selects the top N leading factors explaining the trigger that caused the event. In an example implementation, LIME was employed to identify N leading factors.

Figure 5:
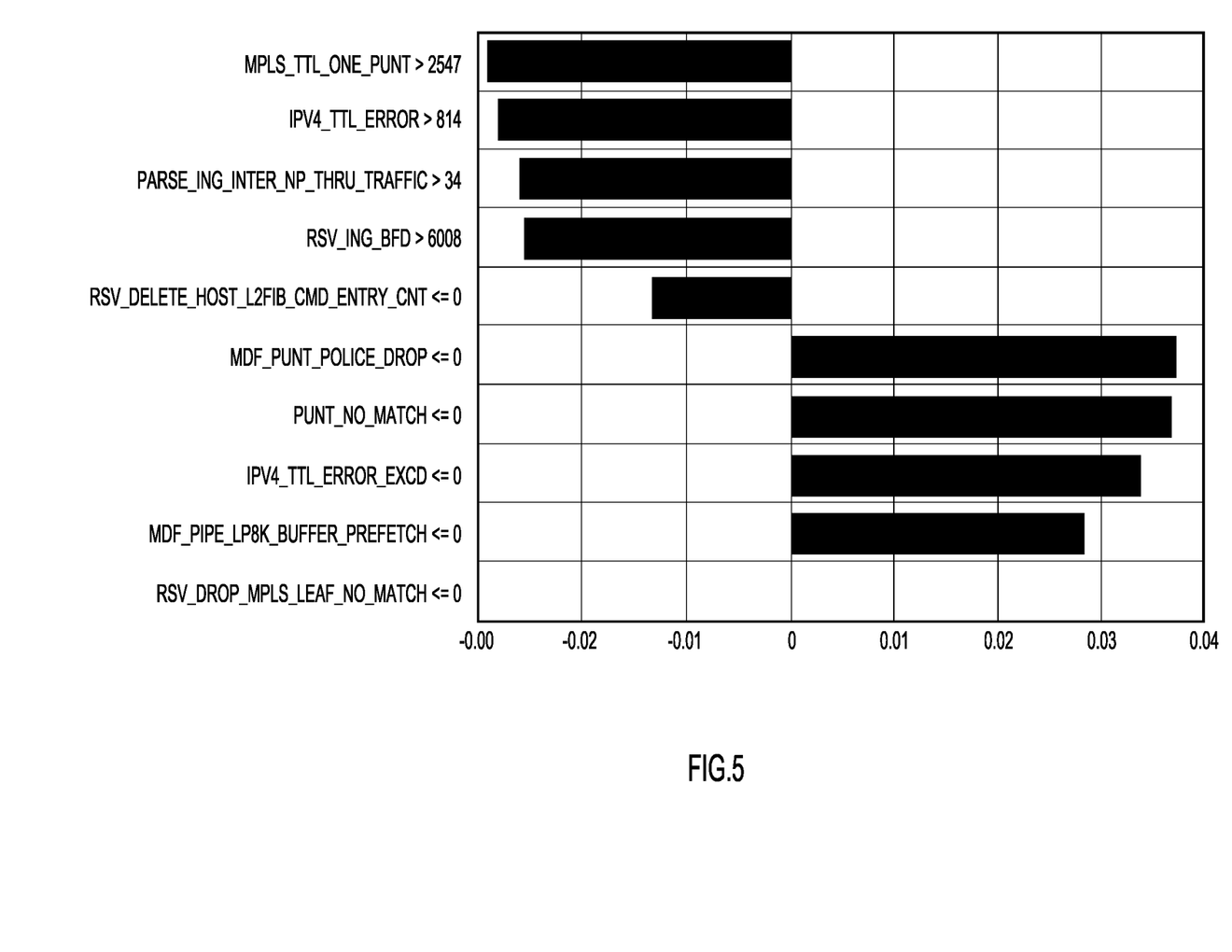
FIG. 5 shows leading factors for anomaly triggers in accordance with an example embodiment.

As shown in FIG. 5, the N=5 leading factors triggering an anomaly on a given specific network node at a certain time are:

MPLS_TTL_ONE_PUNT (multi-protocol label switching time to live)
IPV4_TTL_ERROR (Internet Protocol v. 4)
PARSE_ING_INTER_NP_THRU_TRAFFIC
RSV_ING_BFD
RSV_DELETE_HOST_L2FIB_CMD_ENTRY_CNT Based on the explanation from LIME generated by spatio-temporal event weight estimation logic 150, the above listed counters are those that probably triggered the anomaly signal on the given network node 110. These factors are then notated as: F_ik where F_ik=1 if R_i has an event coming from the factor k.

Nodes Score Computation

In an example embodiment, spatio-temporal event weight estimation logic 150 computes a node severity score for each network 110 node in the network using both spatial and temporal components. The score vector is noted S_i for the router R_i.

1. Spatial component: The spatial component of the severity score for one network node 110 takes into account the co-occurrence of events at adjacent network nodes 110. That is, spatio-temporal event weight estimation logic 150 calculates for each network node 110:

$$S_i = \sum_j \left( A_j * \frac{\sum_k (F_{jk} * F_{ik})}{N} \right)$$

A given network node's 110 spatial component of the severity score will be non-trivial if, e.g., adjacent network nodes 110, e.g., routers, also happen to have events generated by the same leading factors.

2. Temporal component: To increase the reliability of the node severity score, spatio-temporal event weight estimation logic 150 adds a "memory" factor from the past, with a learning rate 0<alpha<1, to overweight scores that persist over time. That is, spatio-temporal event weight estimation logic 150 further adjusts the node severity score based on a weighted re-occurrence value as shown below.

$$S_{i,t} = \sum_j \left( A_j * \frac{\sum_k (F_{jk} * F_{ik})}{N} \right) + \alpha * S_{i,t-1}$$

Usage of the System

The value of this system lies in the telescopic view an operator can obtain from the overall network at any time. The embodiments described herein allow for different levels of view for the network, from the overall network, down to single counter values on a given network node 110. Three main levels can be distinguished. the network level view, a "neighboring nodes" view and the single node view, each having its own diagnostic information to display.

In sum, the described embodiments focus on a novel spatial-temporal analysis technique as well as a mechanism for the extraction of symbolic information. Advantages of the described embodiments include a network level representation taking into account the interactivity between network components, a time (memory) based approach, and the ability to go from a global network view to root causes of anomaly events.

The described embodiments may be used in a Network-Level Data Plane Assurance service (Assurance service). Such a service may provide near real-time insights regarding network data plane issues such as packet loss, blackholing, loops at Layer 2, Layer 3, corruption/mis-rewrites, excess duplication, forwarding engine-related issues, and the like.

Input data for spatio-temporal event weight estimation logic 150 may include, e.g., Model Drive Telemetry (MDT) including network processor counters (np_counters), fast_drops, np_stats and traps for routers. Data may be collected in several ways including MDT, command line interface (CLI) and database (DB) dump format, depending on deployment model. Regardless of the collection process, data may be in the form of a table or data plane instrumentation factors (e.g., counters) collected, e.g., every 300 seconds.

Topology data to generate the adjacency matrix 400 of FIG. 4 may be imported as a Networkx graph which is either recovered from syslog data or a link state advertisement database or a proprietary service. It is important to note that the topology is not limited to physical topology; as long as there is relationship between systems (for example BGP peering, interior gateway protocol (IGP) adjacency, or tunnel of any sort), this information may be used to determine adjacency. Also, the topology can be used in 'as expected' form (one time import) as well as 'as is' (periodic sync)—where this latter approach takes into account changes, both large or small.

Spatio-temporal event weight estimation logic 150, as described herein, is configured to establish the importance of anomalies by taking into account that anomalies experienced by related systems at the same time are more important to the overall system (network) than independently occurring anomalies. Also, anomalies that persist over time on related systems are given more weight, i.e., are more important the longer they occur, normalized by their overall rate in a supersystem (network).

Spatio-temporal event weight estimation logic 150 is configured aggregate forwarding-engine level data to the network level and produce a holistic view of the data plane in such a way that most situations do not require attention. This contrasts with a more underlying view at a forwarding engine level where something is almost always happening.

The embodiments described herein apply the output of Machine Learning introspection upon inferences of automated IC engines to help prevent cognitive overload. The embodiments rank and filter alerts to match with the cognitive bandwidth on the receiving side.

Figure 6:
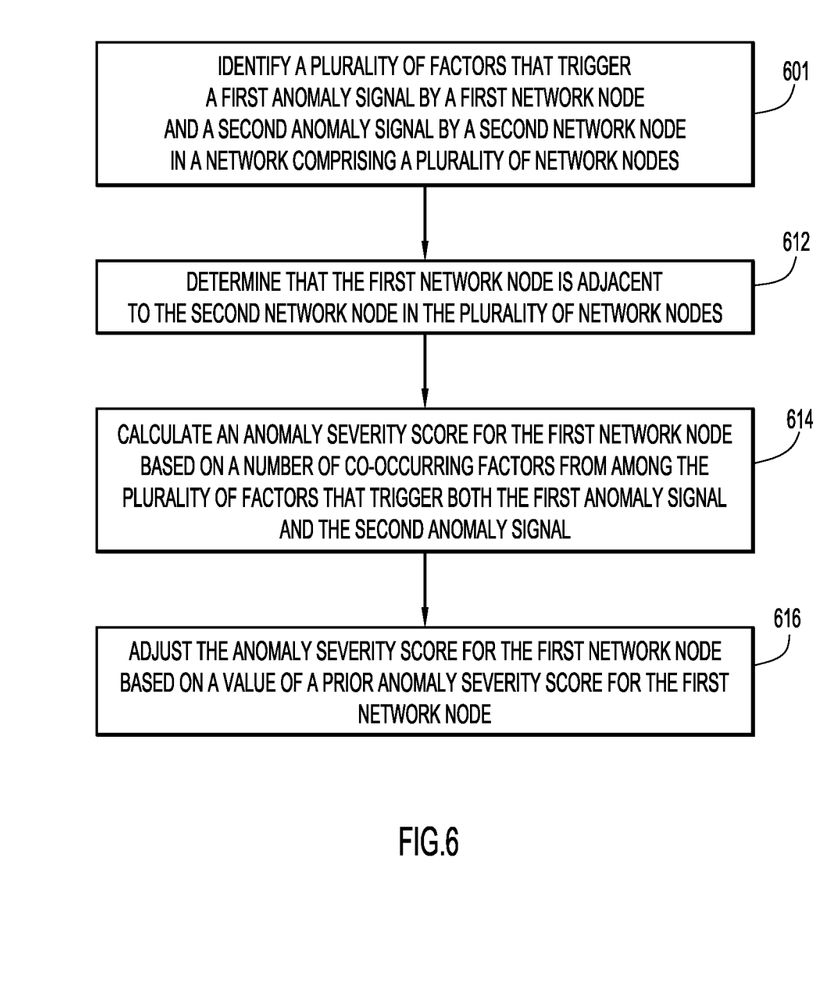
FIG. 6 is a flowchart depicting a series of operations for executing spatio-temporal event weight estimation logic in accordance with an example embodiment.

FIG. 6 is a flowchart depicting a series of operations for executing spatio-temporal event weight estimation logic 150 in accordance with an example embodiment. At 610, logic 150 is configured to identify a plurality of factors that trigger a first anomaly signal by a first network node and a second anomaly signal by a second network node in a network comprising a plurality of network nodes. At 612, logic 150 is configured to determine that the first network node is adjacent to the second network node in the plurality of network nodes. At 614, logic 150 is configured to calculate an anomaly severity score for the first network node based on a number of co-occurring factors from among the plurality of factors that trigger both the first anomaly signal and the second anomaly signal. And, at 616, logic 150 is configured to adjust the anomaly severity score for the first network node based on a value of a prior anomaly severity score for the first network node.

Figure 7:
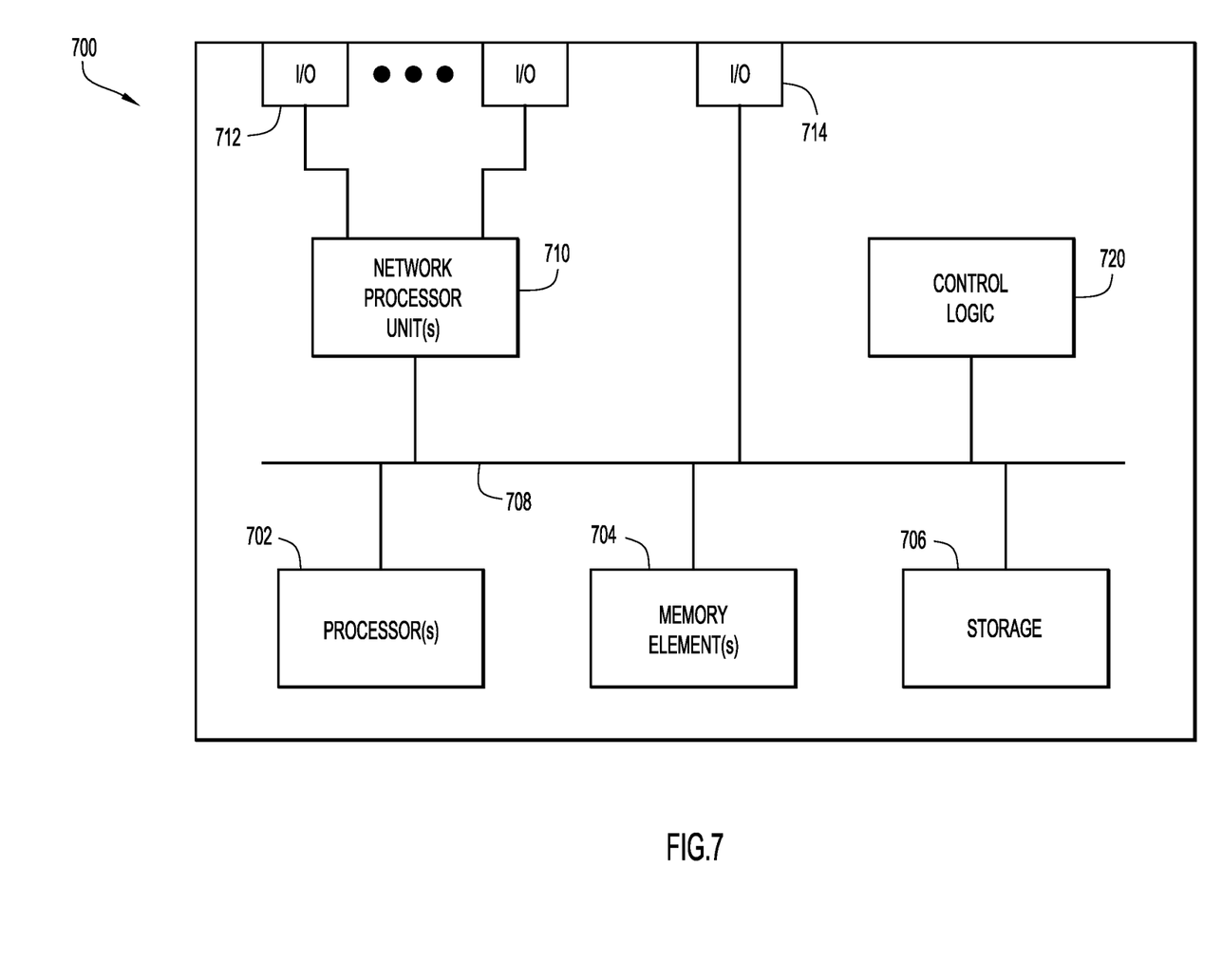
FIG. 7 illustrates a system that may be configured to execute spatio-temporal event weight estimation logic according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device, such as computing device 700 or any combination of computing devices 700, may be configured as any entity/entities as discussed for the techniques depicted in connection with FIGS. 1-6 in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element (s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a method may be provided. The method may include identifying a plurality of factors that trigger a first anomaly signal by a first network node and a second anomaly signal by a second network node in a network comprising a plurality of network nodes; determining that the first network node is adjacent to the second network node in the plurality of network nodes; calculating an anomaly severity score for the first network node based on a number of co-occurring factors from among the plurality of factors that trigger both the first anomaly signal and the second anomaly signal; and adjusting the anomaly severity score for the first network node based on a value of a prior anomaly severity score for the first network node In one embodiment, identifying the plurality of factors that trigger the first anomaly signal by the first network node and the second anomaly signal by the second network node includes executing a machine learning explainability process. The machine learning explainability process may be one of Partial Dependency Plots (PDP), Local Interpretable Model-agnostic Explanations (LIME), or Shapley Additive exPlanations (SHAP).

The method may further include generating an adjacency matrix that represents that the first network node and the second network node are adjacent to one another.

In one embodiment, calculating the anomaly severity score for the first network node includes using the adjacency matrix as a coefficient.

In the method, determining that the first network node is adjacent to the second network node in the plurality of network nodes may include determining if the first network node and the second network node are physically adjacent to one another by no more than one hop. Alternatively or in addition, determining that the first network node is adjacent to the second network node in the plurality of network nodes includes determining if the first network node and the second network node are peer nodes according to a predetermined protocol, such as a border gateway protocol.

In the method, adjusting the anomaly severity score for the first network node based on the value of the prior anomaly severity score for the first network node may include increasing the anomaly severity score by a predetermined factor of the prior anomaly severity score for the first network node. The predetermined factor may be between zero and one.

An apparatus may also be provided. The apparatus may include. a network interface unit configured to enable network communications; a memory configured to store logic instructions; and a processor, when executing the logic instructions, configured to: identify a plurality of factors that trigger a first anomaly signal by a first network node and a second anomaly signal by a second network node in a network comprising a plurality of network nodes; determine that the first network node is adjacent to the second network node in the plurality of network nodes; calculate an anomaly severity score for the first network node based on a number of co-occurring factors from among the plurality of factors that trigger both the first anomaly signal and the second anomaly signal; and adjust the anomaly severity score for the first network node based on a value of a prior anomaly severity score for the first network node.

In an embodiment, the processor may be further configured to identify the plurality of factors that trigger the first anomaly signal by the first network node and the second anomaly signal by the second network node by executing a machine learning explainability process, such as Partial Dependency Plots (PDP), Local Interpretable Model-agnostic Explanations (LIME), or Shapley Additive exPlanations (SHAP).

In an embodiment, the processor may be further configured to generate an adjacency matrix that represents that the first network node and the second network node are adjacent to one another. The processor may be further configured to calculate the anomaly severity score for the first network node using the adjacency matrix as a coefficient.

In an embodiment, the processor may be further configured to determine that the first network node is adjacent to the second network node in the plurality of network nodes by determining if the first network node and the second network node are physically adjacent to one another by no more than one hop. Alternatively, or in addition, the processor is further configured to determine that the first network node is adjacent to the second network node in the plurality of network nodes by determining if the first network node and the second network node are peer nodes according to a predetermined protocol, which may be a border gateway protocol.

In an embodiment, the processor may be further configured to adjust the anomaly severity score for the first network node based on the value of the prior anomaly severity score for the first network node by increasing the anomaly severity score by a predetermined factor of the prior anomaly severity score for the first network node.

In still another form, a non-transitory computer readable storage media is provided. The non-transitory computer readable storage media may be encoded with instructions that, when executed by a processor, cause the processor to: identify a plurality of factors that trigger a first anomaly signal by a first network node and a second anomaly signal by a second network node in a network comprising a plurality of network nodes; determine that the first network node is adjacent to the second network node in the plurality of network nodes; calculate an anomaly severity score for the first network node based on a number of co-occurring factors from among the plurality of factors that trigger both the first anomaly signal and the second anomaly signal; and adjust the anomaly severity score for the first network node based on a value of a prior anomaly severity score for the first network node.

In an embodiment, the instructions may cause the processor to identify the plurality of factors that trigger the first anomaly signal by the first network node and the second anomaly signal by the second network node by executing a machine learning explainability process.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
identifying a plurality of factors that trigger a first anomaly signal by a first network node and a second anomaly signal by a second network node in a network comprising a plurality of network nodes;
determining that the first network node is adjacent to the second network node in the plurality of network nodes;
calculating an anomaly severity score for the first network node based on its adjacency to the second network node, and to a third network node, and based on a number of co-occurring factors from among the plurality of factors that trigger both the first anomaly signal and the second anomaly signal, and that also triggers an anomaly signal from the third network node, wherein the calculating comprises summing the number of co-occurring factors, and dividing a sum resulting from the summing by a total number of factors in the plurality of factors; and
adjusting the anomaly severity score for the first network node based on a value of a prior anomaly severity score for the first network node.

2. The method of claim 1, wherein identifying the plurality of factors that trigger the first anomaly signal by the first network node and the second anomaly signal by the second network node comprises executing a machine learning explainability process.

3. The method of claim 2, wherein the machine learning explainability process is one of Partial Dependency Plots (PDP), Local Interpretable Model-agnostic Explanations (LIME), or Shapley Additive exPlanations (SHAP).

4. The method of claim 1, further comprising generating an adjacency matrix that represents that the first network node and the second network node are adjacent to one another.

5. The method of claim 4, wherein calculating the anomaly severity score for the first network node includes using the adjacency matrix as a coefficient.

6. The method of claim 1, wherein determining that the first network node is adjacent to the second network node in the plurality of network nodes comprises determining if the first network node and the second network node are physically adjacent to one another by no more than one hop.

7. The method of claim 1, wherein determining that the first network node is adjacent to the second network node in the plurality of network nodes comprises determining if the first network node and the second network node are peer nodes according to a predetermined protocol.

8. The method of claim 7, wherein the predetermined protocol is a border gateway protocol.

9. The method of claim 1, wherein adjusting the anomaly severity score for the first network node based on the value of the prior anomaly severity score for the first network node comprises increasing the anomaly severity score by a predetermined factor of the prior anomaly severity score for the first network node.

10. The method of claim 9, wherein the predetermined factor is between zero and one.

11. An apparatus comprising:
a network interface unit configured to enable network communications;
a memory configured to store logic instructions; and
a processor, when executing the logic instructions, configured to:
identify a plurality of factors that trigger a first anomaly signal by a first network node and a second anomaly signal by a second network node in a network comprising a plurality of network nodes;
determine that the first network node is adjacent to the second network node in the plurality of network nodes;
calculate an anomaly severity score for the first network node based on its adjacency to the second network node, and to a third network node, and based on a number of co-occurring factors from among the plurality of factors that trigger both the first anomaly signal and the second anomaly signal, and that also triggers an anomaly signal from the third network node,
wherein the processor is configured to calculate by summing the number of co-occurring factors, and dividing a sum resulting from the summing by a total number of factors in the plurality of factors; and
adjust the anomaly severity score for the first network node based on a value of a prior anomaly severity score for the first network node.

12. The apparatus of claim 11, wherein the processor is further configured to identify the plurality of factors that trigger the first anomaly signal by the first network node and the second anomaly signal by the second network node by executing a machine learning explainability process.

13. The apparatus of claim 12, wherein the machine learning explainability process is one of Partial Dependency Plots (PDP), Local Interpretable Model-agnostic Explanations (LIME), or Shapley Additive exPlanations (SHAP).

14. The apparatus of claim 11, wherein the processor is further configured to generate an adjacency matrix that represents that the first network node and the second network node are adjacent to one another.

15. The apparatus of claim 14, wherein the processor is further configured to calculate the anomaly severity score for the first network node using the adjacency matrix as a coefficient.

16. The apparatus of claim 11, wherein the processor is further configured to determine that the first network node is adjacent to the second network node in the plurality of network nodes by determining if the first network node and the second network node are physically adjacent to one another by no more than one hop.

17. The apparatus of claim 11, wherein the processor is further configured to determine that the first network node is adjacent to the second network node in the plurality of network nodes by determining if the first network node and the second network node are peer nodes according to a predetermined protocol.

18. The apparatus of claim 11, wherein the processor is further configured to adjust the anomaly severity score for the first network node based on the value of the prior anomaly severity score for the first network node by increasing the anomaly severity score by a predetermined factor of the prior anomaly severity score for the first network node.

19. A non-transitory computer readable storage media encoded with instructions that, when executed by a processor, cause the processor to:
- identify a plurality of factors that trigger a first anomaly signal by a first network node and a second anomaly signal by a second network node in a network comprising a plurality of network nodes;
- determine that the first network node is adjacent to the second network node in the plurality of network nodes;
- calculate an anomaly severity score for the first network node based on its adjacency to the second network node, and to a third network node, and based on a number of co-occurring factors from among the plurality of factors that trigger both the first anomaly signal and the second anomaly signal, and that also triggers an anomaly signal from the third network node, wherein the processor is configured to calculate by summing the number of co-occurring factors, and dividing a sum resulting from the summing by a total number of factors in the plurality of factors; and
- adjust the anomaly severity score for the first network node based on a value of a prior anomaly severity score for the first network node.

20. The non-transitory computer readable storage media of claim 19, encoded with instructions that, when executed by the processor, cause the processor to identify the plurality of factors that trigger the first anomaly signal by the first network node and the second anomaly signal by the second network node by executing a machine learning explainability process.

* * * * *